United States Patent

Cutler

[15] 3,665,499
[45] May 23, 1972

[54] FEEDRATE SEVVO CONTROL SYSTEM

[72] Inventor: Hymie Cutler, Detroit, Mich.
[73] Assignee: The Bendix Corporation
[22] Filed: Mar. 30, 1970
[21] Appl. No.: 23,773

[52] U.S. Cl. .........................................318/571, 235/151.11
[51] Int. Cl. ......................................................G05b 19/24
[58] Field of Search ......................318/571, 573; 235/151.11

[56] References Cited

UNITED STATES PATENTS 3,479,574  11/1969  Kosem ..................................318/571
3,128,374  5/1964   Ho et al. ..........................318/573 X

*Primary Examiner*—T. E. Lynch
*Attorney*—William F. Thornton, Barnard, McGlynn and Reising and Plante, Hartz, Smith and Thompson

[57] ABSTRACT

A numerical control system for a milling machine utilizes program tapes which include feedrate commands expressing the desired resultant rate of motion of the machine output member directly in inches per minute. The control system accepts this number and generates a pulse train having a rate proportional to the number by repeatedly adding the number into a register and generating the pulse train from the overflows from that register. This pulse train is provided to a circuit which generates a series of numerical values each equal to the square of the number of pulses received from the train at the time. The pulse commands to each of the individual axis servos are also provided to similar squaring circuits and the numerical values generated by the squaring circuits for these command pulse trains are summed and subtracted from numbers generated from the feedrate control pulse train. Control signals to the controller which generates the command pulse trains are provided so as to maintain an equality between the integrals of the two series of numbers, thereby commanding individual axis motions which will achieve a resultant motion in agreement with the feedrate command.

5 Claims, 3 Drawing Figures 3,665,499

FEEDRATE SERVO CONTROL SYSTEM

BACKGROUND OF THE INVENTION

1. Field of the Invention

This invention relates to contouring type numerical control systems and more particularly to circuitry for controlling the rate of output motion of a machine operating under the control of such a system.

2. Prior Art

Continuous path, or contouring type numerical control systems which are commonly used with milling machines cause the machine output member to be moved along a plurality of axes simultaneously at coordinated rates so as to achieve a desired resultant motion. The axes are normally mutually perpendicular to one another but may include non-perpendicular, such as rotary, axes. Control systems of this type are broadly disclosed in Forrester et al. U.S. Pat. No. 3,069,608.

While the rates at which the individual axis motions take place must bear certain instantaneous ratios to one another in order that the output member will undergo the prescribed path, means must also be provided for controlling each of the component motions in order that the resultant vector motion will occur at a proper rate. For example, the desired resultant rate of motion of a milling machine cutter with respect to the workpiece can be determined from the nature of the material being cut, the dimensions of the cutter, and similar well recognized criteria. In order to achieve this desired resultant motion rate the numerical control program, usually in the form of a tape, contains encoded commanded motion rates, and the control must decode this information and use it in some way to adjust the individual component rates. A typical prior art system for achieving such control is disclosed in Centner et al. U.S. Pat. No. 3,122,691.

A wide variety of particular feedrate techniques have been employed by the prior art, but all suffer from various disadvantages such as difficulty of computation of an appropriate feed code by the programmer, difficulty in manually over-riding the feedrate at the machine, and difficulty in determining what feedrate was intended from examination of a resultant control tape.

SUMMARY OF THE PRESENT INVENTION

The present invention contemplates a feedrate control system wherein no special computation of feedrate numbers need be performed by the programmer. The programmer simply encodes the desired vector feedrate, directly in inches per minute, on the tape. The control system includes means for insuring that the component command signals are generated at such a rate as to achieve this programmed feedrate as well as means to store the feedrate until a subsequent feedrate command appears on the tape.

The system of the present invention broadly operates to compute the resultant motion rate commanded by the component command signals provided to the servos and to compare this rate to the commanded rate. A control signal for the command signal generator is derived from this comparator. The result is closed loop control of the rate of generation of command signals. The comparison technique effectively implements a form of Pythagoras' Theorem.

A preferred embodiment of the invention utilizes the feedrate commands from the tape to generate a pulse train having a frequency proportional to the magnitude of the feedrate command number. This pulse train is provided to a unique pulse-digital converter which generates a numerical quantity equal to the square of the number of pulses which have been received from the train at any time. The command pulse trains provided by the controller to the individual servos are also fed to similar squaring circuits. the numerical quantities which represent the outputs of the squaring circuits for the command pulse trains are summed and subtracted from the numerical quantity representative of the square of the number of pulses in the feedrate pulse train. At such time as the magnitude of the latter square exceeds the magnitude of the sum of the command pulse train squares, the generation of command pulse trains by the controller is initiated. When the sum of the squares of the command pulse trains is greater than the feedrate square, the generation of command pulses is inhibited.

The present invention implements the feedrate control technique with low-cost digital circuitry. The squaring circuit consists of a counter, an adder, and a register. The pulses in each train are entered into the counter and simultaneously into a subtracter. The count then contained in the counter is fed into the subtracter with a shift of one binary unit in the direction of the most significant digit, so that the output actually comprises the quantity $(2N-1)$ where N is the counter sum. The numbers flowing from the subtracter constitute arithmetic progression of $(2N-1)$, the sum of which is equal to $N^2$.

Other objects, advantages and applications of the present invention will be made apparent by the following detailed description of a preferred embodiment of the invention. The description makes reference to the accompanying drawings in which:

FIG. 3 is a schematic diagram of the squaring circuit employed with the system of the present invention.

In the preferred embodiment of the invention, the feedrate control system is utilized with a system of the broad type described in Ho et al. U.S. Pat. No. 3,128,374 wherein the command pulse trains for the individual axis servos are generated by what is termed the "DDA" technique of repeatedly adding a command number into a register generating command pulses in proportion to the overflows from that register. The operation of the system will be described in connection with what is termed linear interpolation, wherein a straight motion of the output members is achieved, as contrasted with more sophisticated circular or parabolic interpolation. However, the system of the present invention is equally applicable to these more sophisticated type systems.

Figure 1:
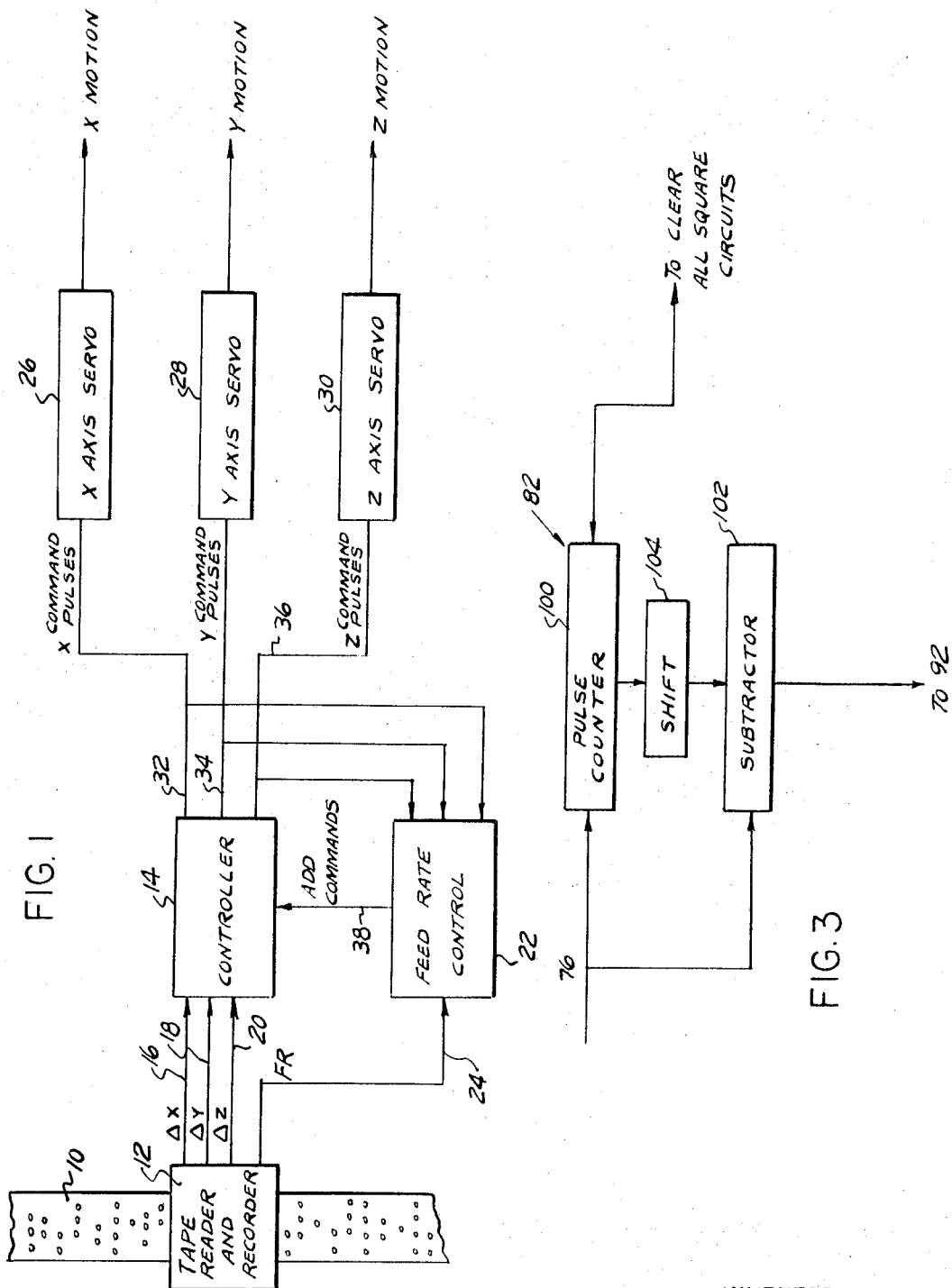
FIG. 1 is a block diagram of a numerical control system embodying the feedrate control of the present invention.

Such a system is very broadly illustrated in FIG. 1. The program for the machine is stored on a tape 10 which may be of a punched variety. This tape is progressively fed to a tape reader and decoder 12 which converts the encoded punches on the tape into electrical signals and routes them to appropriate portions of the system. The preferred embodiment will be described as a three-axis system and accordingly the tape reader 12 provides a controller 14 with signals representative of the commanded displacements along the X, Y and Z axes on lines 16, 18, and 20 respectively. The feedrate signal from the tape reader is routed to a feedrate control system 22, formed in accordance with the present invention, via line 24.

The controller 14 utilizes the X, Y and Z commands to generate three trains of command pulses, one each for the X axis servo 26, Y axis servo 28 and Z axis servo 30. These pulse trains are provided on lines 32, 34 and 36 respectively. The servos 26, 28 and 30 are operative to provide an output motion of their driven members of one increment for each pulse received. For example, such an increment may be 0.0001 inches. The pulses are provided at such high rates that generally the servos provide relatively smooth output motions at rates directly proportional to the instantaneous rate of pulses in their input command train.

The broad function of the controller 14 is to generate command pulse trains each having numbers of pulses proportional to the X, Y and Z command numbers with pulses being generated at rates which are in the same ratio as the X, Y and Z command numbers.

Each of the command pulse trains on lines 32, 34 and 36 is also provided to the feedrate control 22. The feedrate control essentially computes the vector, or resultant rate, at which the output member will move based on the individual rate contributions of the component X, Y and Z axes servos. It compares this resultant rate with the commanded feedrate as derived from the signal provided on line 24 to determine whether the controller 14 is generating the command pulses at the rate which will achieve the desired feedrate. Control signals are provided to the controller 14 by the feedrate controller 22 in the form of add commands on line 38. These add commands adjust the rate of operation of the controller so that the command pulse trains are generated at a proper rate so as to achieve the commanded feedrate. It should be recognized that the add commands adjust the rate of generation of all the pulse trains simultaneously so that the ratio between the instantaneous rates of the pulse trains remains constant independent of the rate of operation of the controller 14.

Figure 2:
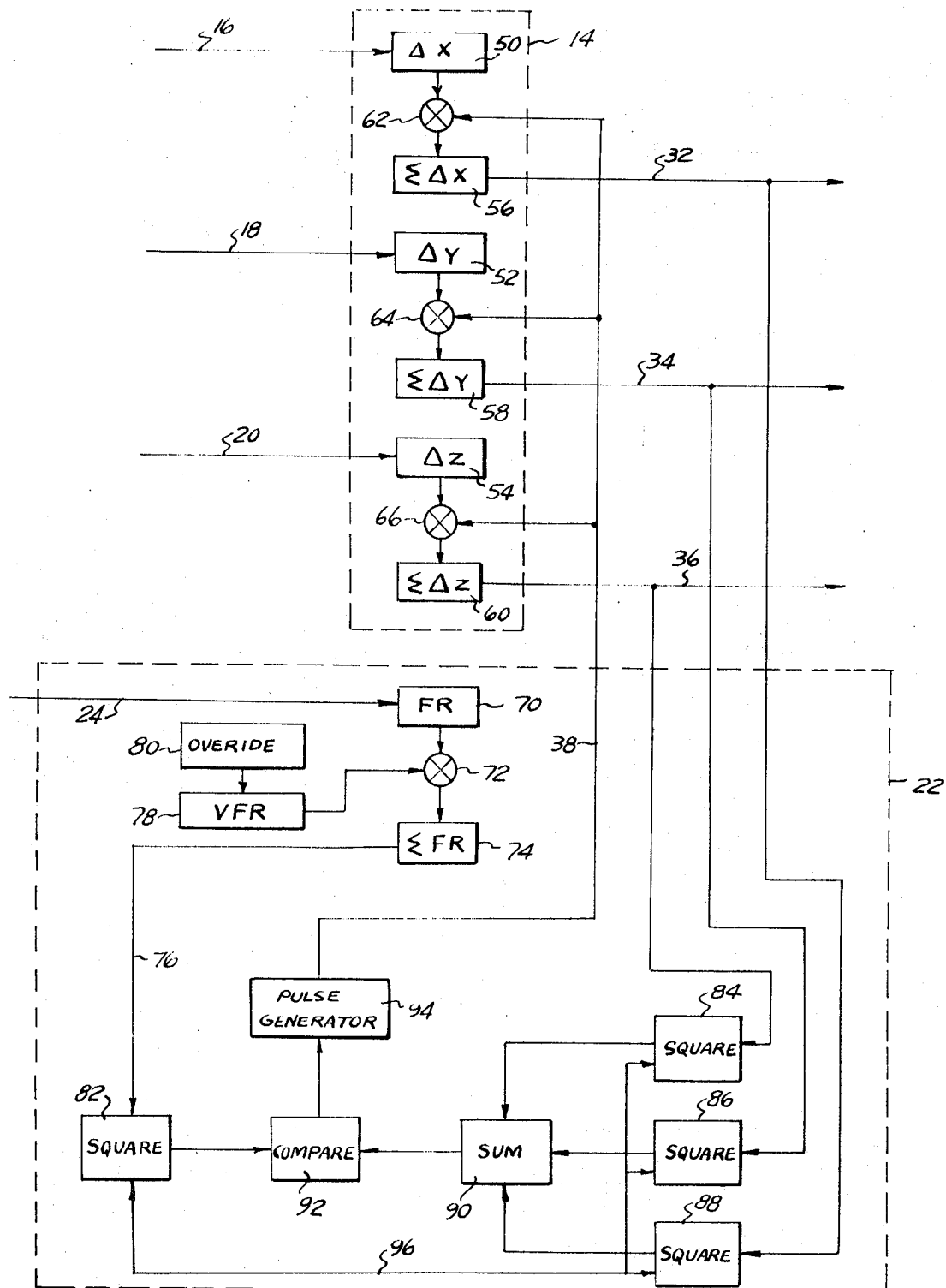
FIG. 2 is a schematic diagram of the controller and IPM control utilized with the system of FIG. 1.

FIG. 2 illustrates the internal sub-system arrangement of the controller 14 and the feedrate control 22. The X Y and Z motion commands on lines 16, 18 and 20 are loaded into command registers 50, 52, and 54 respectively, all contained within the controller 14. Each of these command registers is connected to an associated sum register 56, 58 and 60 respectively through adders 62, 64 and 66. Upon receipt of a pulse on line 38 from the feedrate controller 22, the contents of the command registers are all simultaneously added into their respective sum registers. Each time an overflow occurs from the sum register, an output pulse is provided on that register's output line. Overflows from the sum register 56, into which the X commands are repeatedly added, are provided on line 32 and constitute the X command pulses provided to the X axis servo 26. Similarly, overflows from the Y sum register 58 constitute the Y command pulses on line 34 and overflows from the Z sum register 60 constitute the Z command pulses provided on line 36. Since the sum registers are all of the same length, and the respective command numbers are added into them at the same time, the overflows from the registers will occur at rates proportional to the magnitudes of the respective command numbers, and accordingly the pulse trains on lines 32, 34 and 36 will have pulse rates in the same ratio as the X, Y and Z command members. The controller as thus described is of the same broad form as that disclosed in the previously referred to Ho et al. patent.

The function of the feedrate control 22 is to generate add command pulses on line 38 in such a time sequence as to generate command pulse trains commanding a motion having a resultant feedrate equal to that called for on the program tape 10.

The command feedrate from the tape on line 24 is loaded into a feedrate register 70, contained within the feedrate controller 22. By means of an adder 72 the contents of the feedrate register 70 are repeatedly added into a feedrate sum register 74. The overflows from the sum register, on line 76, constitute a pulse train having a feedrate proportional to the magnitude of the feedrate number.

The add commands for the adder 72 are derived from a variable frequency pulse generator 78. The control voltage for the pulse generator 78 is derived from a manual over-ride circuit 80 which allows the machine operator to adjust the actual feedrate commanded above or below that actually programmed. The override dial is normally calibrated in percentage of programmed feedrate and in the absence of special circumstances it is set at 100 per cent. In any event, the pulses on line 76 occur at a rate proportional to the magnitude of the feedrate number and the percentage called for by the manual over-ride 80.

The pulse train on line 76 is provided to a squaring circuit 82 constituting a pulse-digital converter which generates a series of numbers the sum of which is equal to the square of the number of pulses received on line 76. The internal arrangement of a squaring circuit employed with the preferred embodiment of the invention will be subsequently disclosed in connection with FIG. 3.

The command pulse trains on lines 32, 34 and 36 are provided to similar squaring circuits 84, 86 and 88 in addition to being provided to the X, Y and Z servos respectively. The squaring circuits 84, 86 and 88 are identical to the squaring circuit 82.

The numbers constituting the outputs of the squaring circuits are provided to a sum circuit 90 which simply adds the contents of the squaring circuits 84, 86 and 88 so as to provide a series of numbers equal to the sum of the three inputs. The outputs of the sum circuit and of the squaring circuit 82 are compared in a circuit 92 which effectively subtracts one from the other. When the integral of the numbers provided by the circuit 82 exceeds the integral of the numbers supplied by the sum circuit 90, the comparator 92 provides signals to a pulse generator 94, enabling it to provide output add commands on line 38. These add commands increase the rate of command pulse generation by the controller by providing the add signals to the adders 62, 64 and 66. The rate of the pulse generator 94 is sufficiently high so that the integral of the numbers supplied by the sum unit 90 will rapidly increase to the numerical value of the integral of the outputs of the square circuit 82, even though that numerical value is continually increasing by virtue of additional generation of pulses on line 76. At this point, the reversible sum contained in the circuit 92 will pass through zero and the circuit will send an inhibiting signal to the pulse generator 94 terminating the additional generation of add commands. This process will continue in a see-saw manner so as to maintain an average command pulse rate just sufficient to generate output motion at the vector rate called for by the feedrate signal as modified by the over-ride.

As will subsequently be described, the squaring circuits 82, 84, 86 and 88 all contain counters and after some number of adds one of the counters will be filled to its capacity. Means are provided in each counter to detect that condition and a line 96 which connects all of the squaring circuits then acts to clear them all to zero. This clearing operation may introduce a small error as an add command can be lost, but this error can be made as small as desired by making the counter registers larger.

It will be recognized that the circuit thus described implements the equation:

$$FCP^2 = XCP^2 + YCP^2 + ZCP^2$$

where:
$XCP$ = X axix command pulses per minute;
$YCP$ = Y axis command pulses per minute;
$ZCP$ = Z axis command pulses per minute; and
$FCP$ = rate of pulses generated by the feedrate number.
This equality is, of course, derived from Pythagoras' Theorem.

The internal organization of the squaring circuit 82 is illustrated in FIG. 3. This circuit is, of course, identical to the squaring circuits 84, 86 and 88, except for its external connections.

Input pulses to this circuit on line 76 are provided to a pulse counter 100 which maintains a running count of these pulses. The pulses on line 76 are simultaneously applied to a subtracter 102. The numerical quantity in the counter is also supplied to the subtracter 102 through a shifting circuit 104 which effectively shifts the count one place in the most significant direction, or, since the counter is binary, effectively multiplies it by two. The outputs of the subtracter 102 are applied to the reversible counter 92. If the contents of the counter 100 are termed N, each time a pulse is received on line 76 the subtracter performs the computation $(2N-1)$ and supplies that sum to the reversible counter 92. As shown below, the integral of the numbers provided to counter 92 will have a value of $N^2$:

| $N$ | $\Delta N^2 = (2N-1)$ | $N^2 = \Sigma \Delta N^2$ |
| --- | --- | --- |
| 0 | | 0 |
| 1 | 1 | 0+1=1 |
| 2 | 3 | 1+3=4 |
| 3 | 5 | 4+5=9 |
| 4 | 7 | 9+7=16 |
| 5 | 9 | 16+9=25 |

The mathematical statement of the operation performed above is $$A = \sum_{N=1}^{N} (2N-1)$$

This is an arithmetic progression. Applying the formula for its sum we have $$\text{Sum} = \frac{\text{number of terms}}{2} (\text{first term} + \text{last term})$$

Here the first term = 1 and the last term = $2N-1$

Substituting: $A = \frac{N}{2}(1 + 2N - 1) = N^2$

The embodiments of the present invention in which an exclusive property or privilege is claimed are defined as follows:

1. A numerical position control system, comprising: a plurality of output servos operative to simultaneously move a common member along a plurality of non-coincident axes; an input medium containing numerical information relating to the desired motion of said member in coded form; a controller operative to receive information from said media and to generate command signals in the form of pulse trains for each of said servos at coordinated rates; and means for controlling the rate of generation of command signals by said controller, said last said means comprising, a source of information relating to the desired resultant motion rate of the output members, means for generating a feedrate pulse train having a frequency proportional to said desired rate of motion, means for receiving said feedrate pulse train and generating upon the receipt of each pulse a first number which represents the integral of the quantity $2N-1$ where $N$ is equal to the number of pulses received from said feedrate pulse train, means for receiving each of the command signal pulse trains and from each generating, upon receipt of each pulse, second numbers which represent the integral of the quantity $2N-1$ where $N$ is equal to the number of pulses received in such trains, means for summing said second numbers, and means for subtracting said sum from the first number and for controlling the rate of generation of the command signals in accordance with the output of said subtracter.

2. The system of claim 1 wherein the subtracter comprises a reversible register and said sums are entered into the register in one direction and the first numbers are entered into the register in the opposite direction, and said register generates a control signal causing the controller to operate when its net contents are in one direction and inhibits the operation of the controller when its net contents are in the opposite direction.

3. The system of claim 1 wherein said means for receiving said feedrate pulse train and generating, upon the receipt of each pulse, a first number which represents the integral of the quantity $2N-1$ wherein $N$ is equal to the number of pulses received from said feedrate train, comprises; a binary counter operative to receive each pulse in the train, a subtracter operative to receive the contents of the counter upon the receipt of each pulse in the train and to subtract a uniform quantity therefrom, and means for receiving and summing the outputs of the subtracter.

4. The system of claim 1 wherein said means for receiving each of the command signal pulse trains and from each generating, upon receipt of each pulse, second numbers which represent the integrals of the quantities $2N-1$ where $N$ is equal to the number of pulses received in such trains, comprises for each such train, a counter operative to receive the pulses in the train, a subtracter operative to receive the contents of the counter upon the occurrence of each pulse in the train and to subtract therefrom a fixed quantity, and an accumulator operative to sum the successive outputs of the subtracter.

5. A numerical position control system, comprising: a plurality of output servos operative to simultaneously move a common member along a plurality of non-coincident axes; a source of numerical information relating to the desired path of motion of said member; a controller operative to receive said numerical information and to generate command signals in the form of pulse trains for each of said servos at coordinated rates; and means for controlling the rate of generation of command signals by said controller, said last said means comprising a source of information relating to the desired resultant motion rate of the output members, means for generating a feedrate pulse train having a frequency proportional to said desired resultant motion rate, means for receiving said feedrate pulse train and generating a first signal having a property proportional to the square of the number of pulses received from said feedrate pulse train, means for receiving each of the command signal pulse trains and from each generating a second signal having a property proportional to the square of the number of pulses received from each said train, means for summing the last said signals, and means for subtracting said sum from the first signal and for controlling the rate of generation of the command signals in accordance with the output of said subtracter, wherein at least one of said means for generating the signals having a property proportional to the square of the number of pulses received from a pulse train operates by generating a quantity proportional to the integral of the number of pulses received from such train, subtracting a fixed quantity from said integral, and integrating the subtracted quantities as generated upon the occurrence of each pulse in the train.

* * * * *